United States Patent
Yamada et al.

(10) Patent No.: US 8,869,565 B2
(45) Date of Patent: Oct. 28, 2014

(54) METHOD AND APPARATUS OF PRODUCING OPTICAL FIBER PREFORM

(75) Inventors: Naritoshi Yamada, Sakura (JP); Shunichirou Hirafune, Sakura (JP)

(73) Assignee: Fujikura Ltd., Tokyo (JP)

( * ) Notice: Subject to any disclaimer, the term of this patent is extended or adjusted under 35 U.S.C. 154(b) by 271 days.

(21) Appl. No.: 13/461,374

(22) Filed: May 1, 2012

(65) Prior Publication Data
US 2012/0279259 A1    Nov. 8, 2012

(30) Foreign Application Priority Data
May 2, 2011    (JP) ................ P2011-103132

(51) Int. Cl.
*C03B 37/018* (2006.01)
*C03B 37/014* (2006.01)

(52) U.S. Cl.
CPC ....... *C03B 37/01413* (2013.01); *C03B 2207/52* (2013.01); *C03B 37/0142* (2013.01); *C03B 2207/36* (2013.01); *C03B 2207/54* (2013.01); *C03B 2207/12* (2013.01); *C03B 2207/22* (2013.01); *C03B 2207/60* (2013.01); *C03B 2207/06* (2013.01); *C03B 2207/20* (2013.01); *C03B 2207/81* (2013.01); *C03B 2207/80* (2013.01); *C03B 2207/85* (2013.01)
USPC .............................................. 65/414; 65/531

(58) Field of Classification Search
CPC ................. C03B 37/01413; C03B 37/0142
USPC ..................................................... 65/414, 531
See application file for complete search history.

(56) References Cited

U.S. PATENT DOCUMENTS

2009/0214998 A1*   8/2009 Yoshida .................. 431/350

FOREIGN PATENT DOCUMENTS

| JP | 59-232933 A | 12/1984 |
| JP | 04-170336 A | 6/1992 |
| JP | 04-175239 A | 6/1992 |
| JP | 06-247722 A | 9/1994 |
| JP | 11-079774 A | 3/1999 |

* cited by examiner

*Primary Examiner* — Queenie Dehghan
(74) *Attorney, Agent, or Firm* — Sughrue Mion, PLLC (57) ABSTRACT

A method of producing optical fiber preform includes: forming a deposited layer by depositing glass particles on a periphery of a target element in a deposition mode while burning a mixed gas containing a glass source material gas, a flaming gas, and a supporting gas by use of a flaming burner; maintaining a state where the supporting gas flows at a flow velocity greater than or equal to a flow velocity at which a nozzle end of the supporting gas discharge nozzles does not glow while maintaining a pilot burner by allowing the flaming gas to flow to the seal gas discharge nozzle after a seal gas is replaced with the flaming gas in a case where a mode is changed from the deposition mode to a non-deposition mode; and replacing the flaming gas flowing to the flaming gas port with a purge gas.

2 Claims, 5 Drawing Sheets

METHOD AND APPARATUS OF PRODUCING OPTICAL FIBER PREFORM

CROSS-REFERENCE TO RELATED APPLICATION

This application is based on and claims priority from Japanese Patent Application No. 2011-103132 filed on May 2, 2011, the contents of which are incorporated herein by reference.

BACKGROUND OF THE INVENTION

1. Field of the Invention

The present invention relates to a method and an apparatus of producing optical fiber preform by use of a so-called outside vapor phase deposition method.

2. Background Art

Generally, in an apparatus of producing an optical fiber preform using a manufacturing method which is referred to as an outside vapor phase deposition method, both ends of a rod-shaped target element are held by a glass lathe or the like and the target element is rotated. Glass particles which are generated in the flame of the flaming burner used for generating glass particles are deposited on the periphery of the target element.

The target element may be removed in a subsequent step or may serves as a silica-based glass rod functioning as a core (region) in a case where an optical fiber is produced in a subsequent step.

A flame hydrolysis reaction or the like occurs in the flame due to introducing a glass source material gas into the flame of the burner together with a flaming gas and a supporting gas, and glass particles such as $SiO_2$ are thereby generated.

The glass particles are deposited on the periphery of the rotated target element as described above.

By carrying out the aforementioned deposition step while performing traverse of the flaming burner used for generating glass particles in the axial direction of the target element, a deposited layer having deposited glass particles is formed on the periphery of the target element, and the deposition step is completed when the weight of the deposited layer reaches a predetermined weight.

The glass-particle-deposited body serving as a composite body constituted of the target element and the glass-particle-deposited layer formed in this manner is subjected to a heat treatment in a high-temperature furnace in a subsequent step, the glass-particle-deposited layer thereof is transparent-vitrified by sintering, and an optical fiber preform is obtained.

In the above-described apparatus of producing an optical fiber preform, deposition of glass particles may be carried out by sequentially performing traverse of a plurality of flaming burners used for generating glass particles in a single direction. In this case, after one burner (first burner) only performs glass particle generation and deposition in the period from the deposition start point to the deposition completion point, the burner deviates from the traverse step and moves so as to return the deposition start point so that the burner does not interfere with the other burner (second burner) performing deposition of glass particles and traverse.

In the returning period, it is necessary to make the flame of the burner as small as possible. For this reason, the flow rates of the flaming gas and the supporting gas are made as low as possible or the flow rate of the flaming gas is made as low as possible while closing the valve of the supporting gas in a conventional step.

However, in the case of making the flow rates of the flaming gas and the supporting gas as low as possible in the step of returning from the deposition completion point to the deposition start point as described above, inflammation occurs by the flame at the position close to the nozzle of the flaming burner, a nozzle end glows, and there is a problem in that the lifetime of the burner becomes extremely shortened.

With respect to the foregoing problems, for example, a method of stopping oxygen during a feedback step (for example, refer to Japanese Unexamined Patent Application, First Publication No. H04-170336), a method of supplying a purge gas into an oxygen nozzle during a feedback step (for example, refer to Japanese Unexamined Patent Application, First Publication No. H04-175239), or the like is proposed.

Additionally, as a method of inhibiting the end of an oxygen nozzle from being degraded, for example, a method of combining hydrogen with an inert gas or nitrogen (for example, refer to Japanese Unexamined Patent Application, First Publication No. H11-079774), a method of making the flow velocity high by reducing the thickness of the nozzle to be 1 mm or less (for example, refer to Japanese Unexamined Patent Application, First Publication No. H06-247722), a method of providing a seal layer around a nozzle used for supplying an oxygen gas (for example, refer to Japanese Unexamined Patent Application, First Publication No. S59-232933), or the like is proposed.

In particular, in the above-described Patent Documents, an oxygen gas corresponds to "supporting gas", a hydrogen gas corresponds to "flaming gas", and an inert gas or nitrogen gas corresponds to "purge gas".

However, even where the methods are used which are disclosed in the aforementioned Japanese Unexamined Patent Application, First Publication No. H04-170336 and Japanese Unexamined Patent Application, First Publication No. H04-175239, the nozzle becomes temporarily high temperature at the moment of change in the flow rate of the gas, that is, at the moment of decrease in the flow velocity of the gas. The nozzle may be deformed due to reiteration of a high-temperature state and a low-temperature state.

Additionally, in the method disclosed in Japanese Unexamined Patent Application, First Publication No. H11-079774, deposition efficiency is affected depending on conditions of manufacture in no small part, there is a case where a preferable optical fiber preform cannot be produced.

In the method disclosed in Japanese Unexamined Patent Application, First Publication No. H06-247722, since the flow velocity decreases in the situation, for example, ignition, extinction, pilot burner, or the like, the nozzle glows.

Moreover, if the thickness of the nozzle is 1 mm or less, the deformation in the nozzle by action of the glowing nozzle becomes significant, and eventually, the lifetime thereof is shortened.

Furthermore, in the method disclosed in Japanese Unexamined Patent Application, First Publication No. S59-232933, deformation in the nozzle is avoidable; however, the size of the burner increases and the burner becomes complicated as a result of providing the seal layer, therefore, it is not desirable.

In addition, a degree of precision for manufacture the burner becomes deteriorated, the burner becoming excessively large, and deposition efficiency becomes reduced.

SUMMARY OF THE INVENTION

The invention was made in order to solve the above problems, and has a first object to provide a method of producing optical fiber preform, which is a method of producing optical fiber preform by use of a flaming burner used for generating glass particles, which inhibits degradation in a nozzle end portion due to glowing of the nozzle end portion without a reduction in deposition efficiency, and which inhibits degradation in a nozzle end portion even where the transfer between a deposition mode and a non-deposition mode (pilot burner state) is frequently repeated.

Additionally, the invention has a second object to provide an apparatus of producing an optical fiber preform, which is provided with the flaming burner used for generating glass particles and has a simple constitution, which inhibits degradation in a nozzle end portion due to glowing of the nozzle end portion, and which can prolong the product life of the flaming burner.

A method of producing optical fiber preform of a first aspect of the invention includes: preparing a flaming burner configured to include a glass source material gas discharge nozzle, a seal gas discharge nozzle disposed outside the glass source material gas discharge nozzle, a plurality of supporting gas discharge nozzles arranged separately from the seal gas discharge nozzle, and a flaming gas port disposed outside the seal gas discharge nozzle so as to include the supporting gas discharge nozzles, the supporting gas discharge nozzles having a small hole diameter; forming a deposited layer by depositing glass particles on a periphery of a target element in a deposition mode in which the glass particles are deposited on the periphery of the target element by performing traverse of the flaming burner two or more times in an axial direction of the rotated target element while burning a mixed gas containing a glass source material gas, a flaming gas, and a supporting gas by use of the flaming burner. Therefore, a glass-particle-deposited body is thereby obtained.

In the method of producing optical fiber preform of the first aspect, a state is maintained where the supporting gas flows at the flow velocity greater than or equal to the flow velocity at which a nozzle end of the supporting gas discharge nozzles does not glow while maintaining a pilot burner by allowing the flaming gas to flow to the seal gas discharge nozzle after a seal gas is replaced with the flaming gas in a case where a mode is changed from the deposition mode to a non-deposition mode in which the glass particles are not deposited on the periphery of the target element, and the flaming gas flowing to the flaming gas port is replaced with a purge gas.

In the method of producing optical fiber preform of the first aspect of the invention, it is preferable that, after the flaming gas flowing to the flaming gas port is replaced with the purge gas, one of maintaining of the flow rate of the supporting gas, decreasing of the flow rate of the supporting gas, stopping of supply of the supporting gas, and replacing the supporting gas with the purge gas be carried out.

A method of producing optical fiber preform of a second aspect of the invention includes: preparing a flaming burner configured to include a glass source material gas discharge nozzle, a seal gas discharge nozzle disposed outside the glass source material gas discharge nozzle, a plurality of supporting gas discharge nozzles arranged separately from the seal gas discharge nozzle, and a flaming gas port disposed outside the seal gas discharge nozzle so as to include the supporting gas discharge nozzles, the supporting gas discharge nozzles having a small hole diameter; forming a deposited layer by depositing glass particles on a periphery of a target element in a deposition mode in which the glass particles are deposited on the periphery of the target element by performing traverse of the flaming burner two or more times in an axial direction of the rotated target element while burning a mixed gas containing a glass source material gas, a flaming gas, and a supporting gas by use of the flaming burner. Therefore, a glass-particle-deposited body is thereby obtained.

In the method of producing optical fiber preform of the second aspect, a state is maintained where the supporting gas flows at the flow velocity greater than or equal to the flow velocity at which a nozzle end of the supporting gas discharge nozzles does not glow while maintaining a pilot burner by allowing the flaming gas to flow to the seal gas discharge nozzle in a case where a mode changed to the deposition mode from a non-deposition mode in which the glass particles are not deposited on the periphery of the target element; and a purge gas flowing to the flaming gas port is replaced with the flaming gas.

In the method of producing optical fiber preform of the second aspect of the invention, it is preferable that, before the purge gas flowing to the flaming gas port is replaced with the flaming gas, one of maintaining of the flow rate of the supporting gas, increasing of the flow rate of the supporting gas, starting of supply of the supporting gas, and replacing the purge gas with the supporting gas be carried out.

An apparatus of producing an optical fiber preform of a third aspect of the invention includes: a flaming burner configured to include a glass source material gas discharge nozzle, a seal gas discharge nozzle disposed outside the glass source material gas discharge nozzle, a plurality of supporting gas discharge nozzles arranged separately from the seal gas discharge nozzle, and a flaming gas port disposed outside the seal gas discharge nozzle so as to include the supporting gas discharge nozzles, the supporting gas discharge nozzles having a small hole diameter, the flaming burner burning a mixed gas containing a glass source material gas, a flaming gas, and a supporting gas so that glass particles are deposited on a periphery of a target element; a first gas switching mechanism replacing a seal gas flowing to the seal gas discharge nozzle with the flaming gas or replacing the flaming gas flowing to the seal gas discharge nozzle with the seal gas when transfer between a deposition mode in which the glass particles are deposited on the periphery of the target element and a non-deposition mode in which the glass particles are not deposited on the periphery of the target element is carried out; and a second gas switching mechanism maintaining a state where the supporting gas flows at the flow velocity greater than or equal to the flow velocity at which a nozzle end of the supporting gas discharge nozzles does not glow while maintaining a pilot burner by allowing the flaming gas to flow to the seal gas discharge nozzle, and replacing the flaming gas flowing to the flaming gas port with a purge gas. Furthermore, in the apparatus of producing an optical fiber preform of the third aspect, a deposited layer is formed by performing traverse of the flaming burner two or more times in an axial direction of the rotated target element so that the glass particles are deposited on the periphery of the target element, and a glass-particle-deposited body is thereby obtained.

In the method of producing optical fiber preform of the first aspect of the invention, a deposition step is transferred from the deposition mode in which the glass particles are deposited on the periphery of the target element to the non-deposition mode in which the glass particles are not deposited on the periphery of the target element. In the case where a mode is changed from the deposition mode to the non-deposition mode as stated above, a state is maintained where the supporting gas flows at the flow velocity greater than or equal to the flow velocity at which the nozzle end of the supporting gas discharge nozzles does not glow while maintaining a pilot burner by allowing the flaming gas to flow to the seal gas discharge nozzle after a seal gas is replaced with the flaming gas, and the flaming gas flowing to the flaming gas port is replaced with a purge gas.

As a result of maintaining a state where the supporting gas flows at the flow velocity greater than or equal to the flow velocity at which the nozzle end does not glow at the flaming gas port when a mode is changed from the deposition mode to the non-deposition mode, the nozzle end does not glow even though the flow velocity of the flaming gas becomes slow at some level.

In a state where the flaming gas flowing to the flaming gas port is replaced with the purge gas, since inflammation does not occur, the temperature of the nozzle end does not increase to a high temperature.

That is, the conditions where the temperature of the nozzle end increases to a high temperature are not made.

At this time, when the flow rate of the supporting gas is maintained, or the flow rate of the supporting gas decreases, or supply of the supporting gas is stopped, or the supporting gas is replaced with the purge gas, the conditions where the temperature of the nozzle end increases to a high temperature are not made, and a more preferable effect is obtained.

Particularly, since the supporting gas discharge nozzle supplying the supporting gas is arranged separately from the seal gas discharge nozzle supplying the flaming gas in the non-deposition mode, it is possible to prevent the nozzle end from glowing.

Moreover, since the pilot burner is maintained by the flaming gas flowing to the seal gas discharge nozzle, it is possible to reliably and quickly perform ignition using the pilot burner when a mode is changed from the non-deposition mode to the deposition mode in a subsequent step, and the efficiency is not made low.

As a result, according to the first aspect of the invention, it is possible to provide a method of producing optical fiber preform, where degradation in the nozzle end portion which is due to the nozzle end portion glowing is inhibited without a reduction in deposition efficiency, particularly, degradation in the nozzle end portion is inhibited in the case where the transferring from the deposition mode to the non-deposition mode (pilot burner state) is frequently repeated.

In other cases, the flame of the flaming burner may be extinguished (fire extinguished state), that is, the flaming burner may be transferred from "pilot burner state" to "fire extinguished state", after the flaming gas flowing to the flaming gas port is replaced with the purge gas.

In the method of producing optical fiber preform of the second aspect of the invention, a deposition step is transferred from the non-deposition mode in which the glass particles are not deposited on the periphery of the target element to the deposition mode in which the glass particles are deposited on the periphery of the target element. In the case where a mode is changed from the non-deposition mode to the deposition mode as stated above, while maintaining a pilot burner by allowing the flaming gas to flow to the seal gas discharge nozzle, a state is maintained where the supporting gas flows at the flow velocity greater than or equal to the flow velocity at which the nozzle end of the supporting gas discharge nozzles does not grow, and the purge gas flowing to the flaming gas port is replaced with the flaming gas.

Since inflammation does not occur in a state where the flaming gas serving as a gas flowing to the flaming gas port is replaced with the purge gas, the nozzle end does not become a high-temperature state.

When a mode is changed from the non-deposition mode to the deposition mode, due to maintaining a state where the supporting gas flows at the flow velocity greater than or equal to the flow velocity at which the nozzle end of the supporting gas discharge nozzles does not glow, the nozzle end does not glow even when the flow velocity of the flaming gas becomes slow at some level.

That is, the conditions where the temperature of the nozzle end increases to a high temperature are not made.

At this time, when the flow rate of the supporting gas is maintained, or the flow rate of the supporting gas increases, or supply of the supporting gas starts, or the purge gas is replaced with the supporting gas, the conditions where the temperature of the nozzle end increases to a high temperature are not made, and a more preferable effect is obtained.

Additionally, since the pilot burner is maintained by the flaming gas flowing to the seal gas discharge nozzle, it is possible to reliably and quickly perform ignition using the pilot burner when a mode is changed from the non-deposition mode to the deposition mode, and the efficiency is not made low.

As a result, according to the second aspect of the invention, it is possible to provide a method of producing optical fiber preform, where degradation in the nozzle end portion which is due to the nozzle end portion glowing is inhibited without a reduction in deposition efficiency, particularly, degradation in the nozzle end portion is inhibited in the case where the transferring from the non-deposition mode (pilot burner state) to the deposition mode is frequently repeated.

In other cases, the flame of the flaming burner may be extinguished (fire extinguished state), that is, the flaming burner may be transferred from "fire extinguished state" to "pilot burner state", before the purge gas flowing to the flaming gas port is replaced with the flaming gas.

The apparatus of producing an optical fiber preform of the third aspect of the invention is provided with the first gas switching mechanism replacing the seal gas flowing to the seal gas discharge nozzle with the flaming gas or replacing the flaming gas flowing to the seal gas discharge nozzle with the seal gas when a mode is changed from the deposition mode to the non-deposition mode or when a mode is changed from the non-deposition mode to the deposition mode. Additionally, this manufacturing apparatus is provided with the second gas switching mechanism maintaining a state where the supporting gas flows at the flow velocity greater than or equal to the flow velocity at which the nozzle end of the supporting gas discharge nozzles does not glow and replacing the flaming gas flowing to the flaming gas port with the purge gas while maintaining a pilot burner by allowing the flaming gas to flow to the seal gas discharge nozzle.

As a result of maintaining a state where the supporting gas flows at the flow velocity greater than or equal to the flow velocity at which the nozzle end does not glow at the flaming gas port at the time of, for example, transferring from the deposition mode to the non-deposition mode, the nozzle end does not glow even though the flow velocity of the flaming gas becomes slow at some level.

In a state where the flaming gas is replaced with the purge gas, since inflammation does not occur, the temperature of the nozzle end does not increase to a high temperature.

Thereafter, the conditions where the temperature of the nozzle end increases to a high temperature are not made as a result of stopping the supply of the supporting or replacing the supporting gas with the purge gas.

Because of this, according to apparatus of producing an optical fiber preform of the invention, the nozzle end of the flaming burner is prevented from glowing.

Moreover, when a mode is also changed from the non-deposition mode to the deposition mode, an action and an effect similar to the above-described action and effect are obtained.

Particularly, since the supporting gas discharge nozzle supplying the supporting gas is arranged separately from the seal gas discharge nozzle supplying the flaming gas in the non-deposition mode, it is possible to prevent the nozzle end from glowing.

Furthermore, since the pilot burner is maintained by the flaming gas flowing to the seal gas discharge nozzle, it is possible to reliably and quickly perform ignition using the pilot burner when a mode is changed from the non-deposition mode to the deposition mode, and the efficiency is not made low.

As a result, according to the invention, the apparatus of producing an optical fiber preform, which is provided with the flaming burner used for generating glass particles, has a simple constitution, inhibits degradation in the nozzle end portion due to glowing of the nozzle end portion, and can prolong the product life of the flaming burner.

Particularly, since the nozzle used for discharging a seal gas is utilized for a pilot burner without providing a nozzle used for a pilot burner in the invention, the burner is not complicated due to an increase in the number of nozzles and does not increase in size thereof, and it is possible to prevent the burner from being degraded.

In particular, "purge gas" of the invention is a gas substituted for a specified gas and is a gas having relatively-low reactivity.

Specifically, for example, an inert gas such as nitrogen, helium, neon, argon, or the like is adopted as the purge gas.

Furthermore, "seal gas" of the invention delays the action of a plurality of gases discharged from nozzles coming into contact with each other, and delays the timing of start of a reaction by a desired amount of time. For this reason, the seal gas is a flowing gas used to prevent the nozzle end from being adversely affected by reactive product or energy.

Specifically, the invention prevents the glass particles, which are generated by the action of immediately coming into contact with an oxyhydrogen flame after the glass source material gas is discharged, from being deposited on the nozzle end.

An inert gas or a nitrogen gas having low reactivity such as argon or the like is preferably used as the seal gas.

DESCRIPTION OF THE PREFERRED EMBODIMENTS

Hereinafter, a preferred embodiment of the invention will be described.

Figure 1:
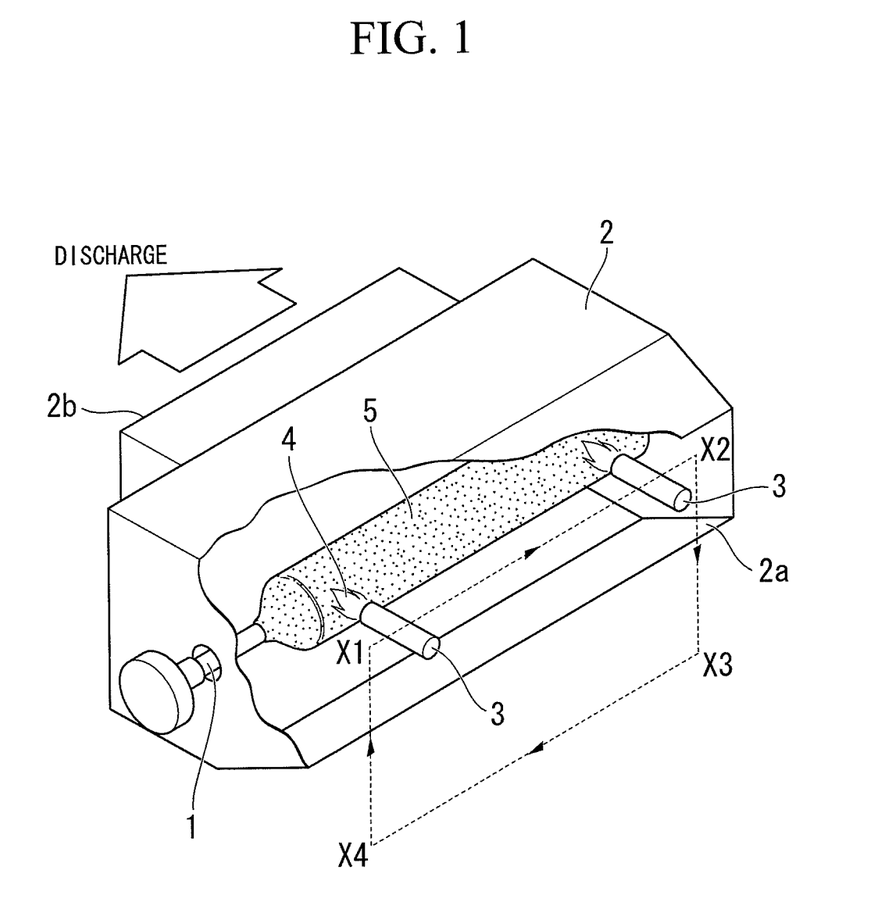
FIG. 1 is an explanatory diagram substantially illustrating an example of a manufacturing apparatus system used for a method of producing optical fiber preform.
Figure 2:
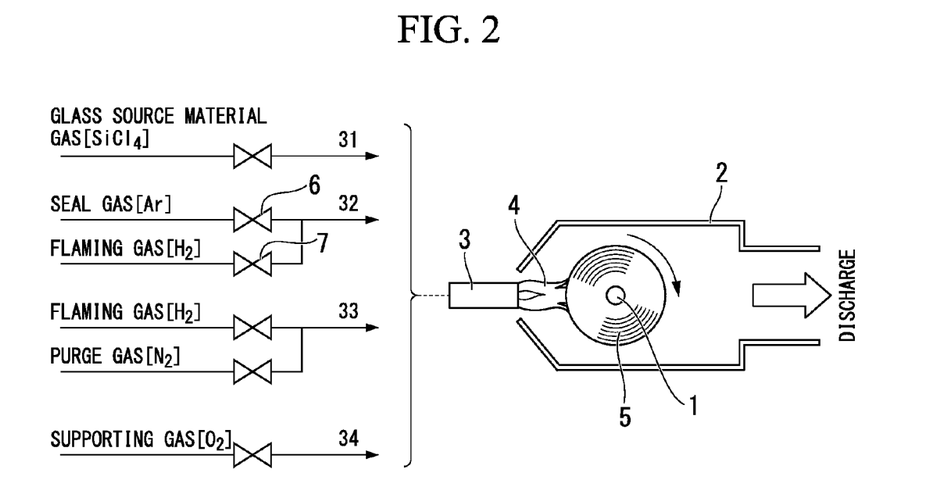
FIG. 2 is an explanatory diagram substantially illustrating an example of a manufacturing apparatus system used for a method of producing optical fiber preform.

FIGS. 1 and 2 are explanatory diagrams substantially illustrating an example of a manufacturing apparatus system used for a method of producing optical fiber preform rerated to an embodiment of the invention.

In FIGS. 1 and 2, reference numeral 1 represents a target element. The target element 1 is housed in a chamber 2, and both ends of the target element are rotatably supported by a glass lathe or the like.

Particularly, the target element 1 is constituted of a member which is to be removed in a subsequent step or a rod which becomes a core of an optical fiber preform.

The chamber 2 rectifies flame and a stream of glass particles and serves to protect the glass-particle-deposited layer.

An opening portion 2a is provided at one position of the chamber 2 (right below side of FIG. 1, first end) along the axial direction of the target element 1 arranged in the chamber 2, and an exhaust portion 2b from which a flaming gas or the like is discharged is provided at the other position of the chamber 2 (left above side of FIG. 1, second end).

A flaming burner 3 used for combining the glass particles is arranged at the opening portion 2a of the chamber 2. The flaming burner 3 traverses the zone shown in the drawing (point X1→point X2→point X3→point X4→point X1, that is, moving from the point X1 to the point X2, moving from the point X2 to the point X3, moving from the point X3 to the point X4, and moving from the point X4 to the point X1) by operation of a traverse unit provided outside the chamber 2 (not shown in the figure), and the flaming burner 3 moves so as to circulate in the above-described zone. In the explanation described below, "traverse" means the motion of relatively transferring the flaming burner in the longitudinal direction of the target element and the direction orthogonal to the longitudinal direction.

Hereinbelow, the case where the flaming burner 3 has a multi-tube structure will be described as an example in details (refer to FIG. 3). However, a method of producing optical fiber preform, which is related to the invention, is not restricted to this configuration.

Figure 3:
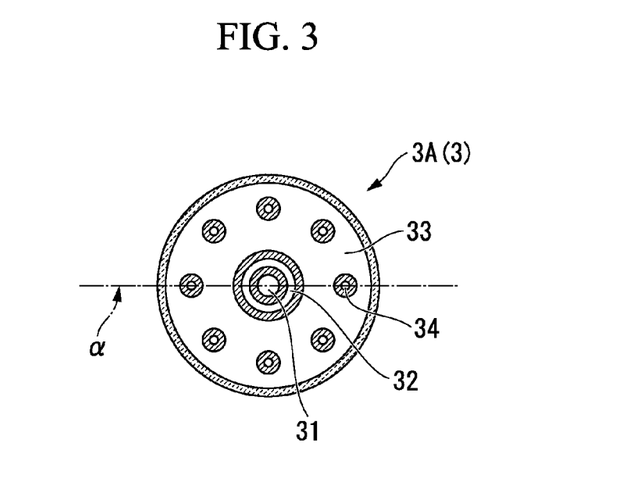
FIG. 3 is a view showing an example of a nozzle of a flaming burner as viewed from the end of the flaming burner.

Here, FIG. 3 shows an example of the nozzle of the flaming burner 3 used in the foregoing manufacturing apparatus and is a view seen from an end of the flaming burner 3.

The flaming burner 3A (3) is provided with a glass source material gas discharge nozzle 31, a seal gas discharge nozzle 32, and a flaming gas port 33. Here, the glass source material gas discharge nozzle 31 is located at the center of the flaming burner 3A. The seal gas discharge nozzle 32 is located outside the glass source material gas discharge nozzle 31. The flaming gas port 33 is located outside the seal gas discharge nozzle 32. Additionally, a plurality of supporting gas discharge nozzles 34 which have a small hole diameter and which are arranged separately from the seal gas discharge nozzle 32 are provided inside the flaming gas port 33.

The flaming gas port 33 shown in FIG. 3 is provided outside the seal gas discharge nozzle 32 and has a concentric structure in which the nozzles are concentrically arranged (particularly, concentric circle form). All of nozzles are laid out such that the nozzles 31, 32, 33, and 43 are symmetrical to each other with respect to the symmetry axis represented by reference numeral α.

Particularly, the flaming gas port 33 is provided with a plurality of supporting gas discharge nozzles 34 which are arranged in a concentric pattern with respect to the glass source material gas discharge nozzle 31 and which have a small hole diameter.

A flaming gas ($H_2$ gas in this embodiment), a supporting gas ($O_2$ gas), a glass source material gas ($SiCl_4$), a seal gas (Ar gas or the like), and a purge gas ($N_2$ gas) are supplied to the flaming burner 3 having the foregoing nozzle structure from various gas supply sources (not shown in the figure) through various gas supply pipes.

Specifically, the glass source material gas ($SiCl_4$) is supplied to the glass source material gas discharge nozzle 31.

In other cases, at least one of the supporting gas and the flaming gas may be supplied to the glass source material gas discharge nozzle 31 together with the glass source material gas.

Consequently, it is possible to prevent a pilot burner from being extinguished by blowing.

Particularly, when the supporting gas discharge nozzle 34 supplies the supporting gas, if the supporting gas flows to the supporting gas discharge nozzle 34 at the flow velocity greater than or equal to the flow velocity at which the nozzle end thereof at the glass source material gas discharge nozzle 31 does not glow, a degradation in the glass source material gas discharge nozzle 31 can also be prevented.

As shown in the left side of FIG. 2, the above-described gases are appropriately introduced into the flaming burner 3.

For example, in the case of the flaming burner 3 having constitution shown in FIG. 3, the seal gas (Ar gas or the like) or the flaming gas ($H_2$ gas) is supplied to the seal gas discharge nozzle 32.

Additionally, the flaming gas ($H_2$ gas) or the purge gas ($N_2$ gas) is supplied to the flaming gas port 33.

A pipe used for supplying the seal gas and a pipe used for supplying the flaming gas, which are, for example, parallel to each other, are connected to a seal gas supply pipe connected to the seal gas discharge nozzle 32. A valve is provided at each of the pipes used for supplying the seal gas and the flaming gas. The switching between the supply of the seal gas and the supply of the flaming gas is carried out by operation of opening and closing the valves, and the flow rate of the gas flowing to each pipe is controlled.

A structure in which a three-way valve or the like is utilized may be used as the above piping structure, and a constitution having a function of switching between the supply of the seal gas and the supply of the flaming gas is adopted.

For example, a pipe used for supplying the purge gas is added to the flaming gas supply pipe connected to the flaming gas port 33. A valve is provided at each of the flaming gas supply pipe and the pipe used for supplying the purge gas. Switching between the supply of the flaming gas and the supply of the purge gas is carried out by operation of opening and closing the valves, and the flow rate of the gas flowing to each pipe is controlled.

A structure in which a three-way valve or the like is utilized may be used as the above piping structure, and a constitution having a function of switching between the supply of the flaming gas and the supply of the purge gas is adopted.

The supporting gas ($O_2$ gas) is supplied to the supporting gas discharge nozzle 34.

Furthermore, the flaming burner 3 may have a mechanism capable of replacing the supporting gas with the purge gas.

As described later in detail, the apparatus of producing an optical fiber preform of the embodiment of the invention transfers from a deposition mode in which glass particles are deposited around the target element 1 to a non-deposition mode in which the glass particles are not deposited around the target element. When a mode is changed from the deposition mode to the non-deposition mode as mentioned above, the seal gas is replaced with the flaming gas, a pilot burner is maintained by allowing the flaming gas to flow to the seal gas discharge nozzle 32, a state is maintained where the supporting gas flows at the flow velocity greater than or equal to the flow velocity at which the nozzle end of the supporting gas discharge nozzle 34 does not glow, and the flaming gas flowing to the flaming gas port 33 is replaced with the purge gas. Subsequently, the flow rate of the supporting gas is maintained, or the flow rate of the supporting gas decreases, or supply of the supporting gas is stopped, or the supporting gas is replaced with the purge gas. The apparatus of producing an optical fiber preform is provided with a gas switching mechanism controlling the above-described gas supply.

The gas switching mechanism also performs supply of the supporting gas or the purge gas, controlling the flow rate, or stopping the gas supply when a mode is changed from the non-deposition mode to the deposition mode.

By unidirectionally performing traverse two or more times in an axial direction of a rotating target element using the foregoing apparatus system, a glass-particle-deposited layer 5 is formed on the periphery of the target element 1, and a glass-particle-deposited body is obtained.

Specifically, firstly, the flaming burner 3 is arranged so as to face the outer peripheral face of the target element 1. Next, traverse of the flaming burner 3 is carried out (transfer) from the deposition start position corresponding to the point represented by reference numeral X1 in FIG. 1 toward the deposition completion position corresponding to the point represented by reference numeral X2 in FIG. 1 while rotating the target element 1 and generating inflammation by the flaming burner 3.

A deposition step (deposition mode) using the flaming burner 3 is carried out in the zone from the point X1 toward the point X2. At this time, the flaming gas, the supporting gas, the glass source material gas, and an inert gas are supplied to the burner by opening a valve 6 and closing a valve 7, and glass particles are generated in the flame 4 by action of flame hydrolysis reaction. The glass particles generated in the flame 4 are attached to the periphery of the target element 1 and are increasingly deposited on the target element 1 as the glass-particle-deposited layer 5.

When the flaming burner 3 reaches the point X2 that is the deposition completion position and the deposition step is completed, the flaming burner 3 enters a feedback step (non-deposition mode). In the feedback step, the flaming burner 3 transfers from the point X2 to the point X3, transfers from the point X3 to the point X4, and returns to the point X1 that is the deposition start position by driving the traverse unit provided outside the chamber 2.

The flaming burner 3 (first burner) moves back from the point X2, leaves the target element 1 and the opening portion 2a of the chamber 2, lowers down to the point X3, and transfers from the point X3 to the point X4 in the direction toward the left side in FIG. 1 so as not to come into contact with the other burner (second burner).

Consequently, when the flaming burner 3 reaches the left end point X4 in FIG. 1, the flaming burner 3 moves up in the direction toward the point X1, enters the chamber 2, and again moves from the point X1 to the point X2.

By reiteration of circulation of the traverse two or more times, the glass-particle-deposited layer 5 is gradually deposited and grown on the target element 1, a glass-particle-deposited body having a desired diameter is thereby obtained.

In other cases, the invention in not limited to the above-described "circulation system", but "reciprocation system" may be adopted. In the reciprocation system, the traverse is carried out by transferring the flaming burner relative to the target element in the longitudinal direction of the target element.

Here, an example of the reciprocation system will be described. Firstly, similarly to the above-described circulation system, the flaming burner transfers from the point X1 to the point X2. After the flaming burner reaches the point X2, the traverse is carried out from the point X2 toward the point X1 in a state where a pilot burner is maintained. After the flaming burner reaches the point X1, the pilot burner is changed to a flame used in the deposition mode, and the traverse is again performed from the point X1 toward the point X2.

At this time, it is only necessary to transfer the burner relatively to the target element.

Particularly, one of the target element and the burner is fixed and the other thereof may be transferred, or both the target element and the burner may be transferred.

Moreover, as an example of the reciprocation system, a constitution is employed which has the regions used for non-deposition mode (from the point X2 to the point X3 and from the point X4 to the point X1) are located at both side of the region used for the deposition mode (from the point X1 to the point X2).

With this configuration, the burner is transferred, for example, in order of "the point X1→the point X2→the point X3→the point X2→the point X1→the point X4→the point X1→the point X2→the point X3→the point X2 ...".

Particularly, this system is effective in the case where one burner unit is constituted of two or more burners and the burner unit is driven.

That is, according to this configuration, a plurality of burners included in the unit can be transferred to the non-deposition mode at a different timing.

In the invention, the method of repetitively performing the foregoing operation is defined as a "reciprocation system".

The glass-particle-deposited body which is configured to include the porous solid formed in this manner is removed from the chamber 2, thereafter, the glass-particle-deposited body is subjected to a heat-treatment in a high-temperature heating furnace, the glass-particle-deposited body is transparent-vitrified, and a desired optical fiber preform is thereby obtained.

Particularly, the method of producing optical fiber preform of the embodiment of the invention transfers the deposition mode for depositing the glass particles on the periphery of the target element 1 (i.e., the zone from the point X1 to the point X2) to the non-deposition mode for not depositing the glass particles on the periphery of the target element 1 (feedback mode, i.e., the zone in the order of the point X2→the point X3→the point X4→the point X1) in the above-described circulation of the traverse of the flaming burner 3. When a mode is changed from the deposition mode to the non-deposition mode, the seal gas is replaced with the flaming gas, a pilot burner is maintained by allowing the flaming gas to flow to the seal gas discharge nozzle 32, a state is maintained where the supporting gas flows at the flow velocity greater than or equal to the flow velocity at which the nozzle end of the supporting gas discharge nozzle 34 does not glow, and the the flaming gas flowing to the flaming gas port 33 is replaced with the purge gas. Subsequently, supply of the supporting gas is stopped or the supporting gas is replaced with the purge gas (step α).

Figure 4:
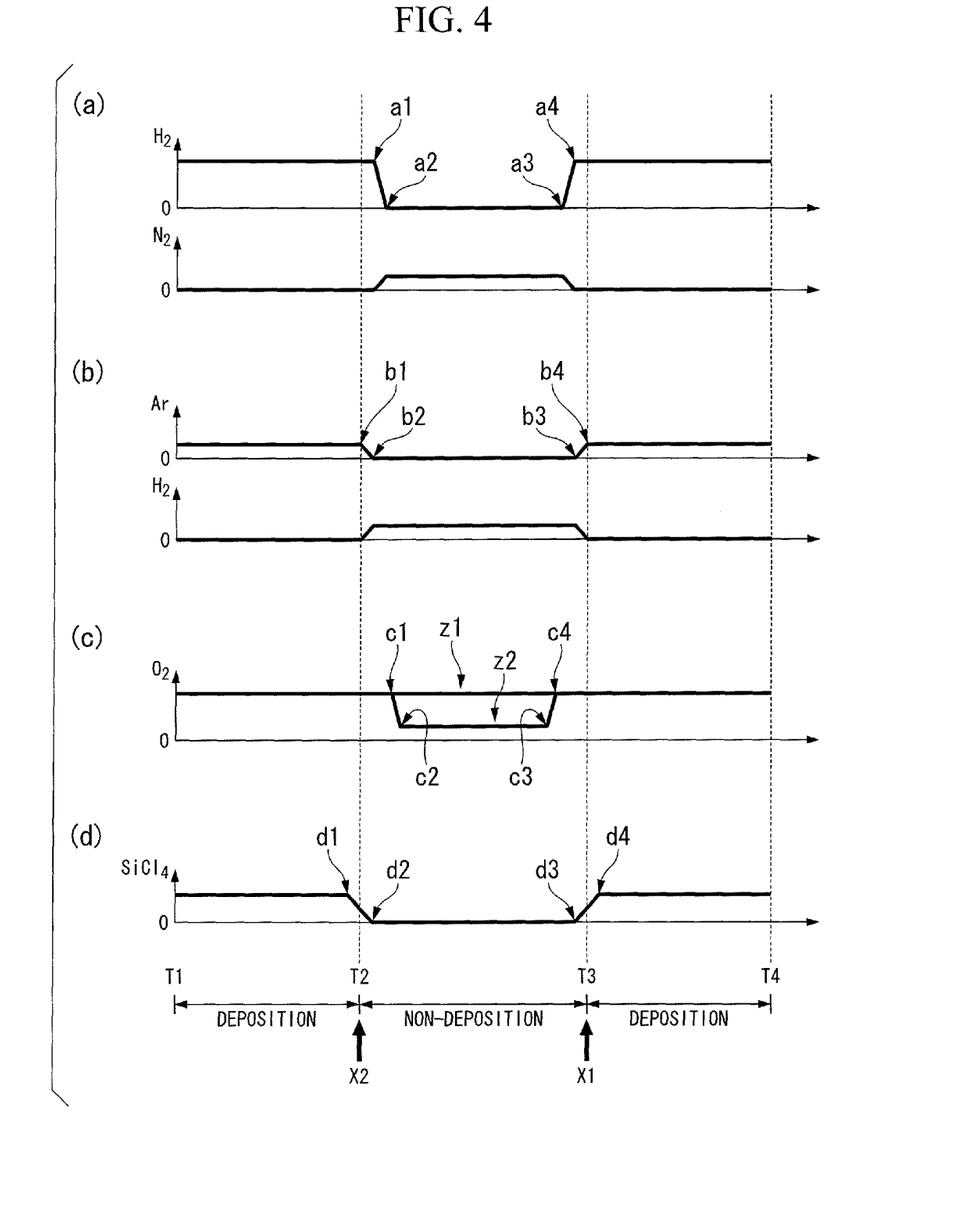
FIG. 4 is a diagram illustrating flow rates of various gases which are supplied to the flaming burner in a circulation pathway of performing traverse of the flaming burner.

FIG. 4 collectively and schematically illustrates a change in the flow rates of various gases which are supplied to the flaming burner 3 in the circulation of the traverse of the flaming burner 3 in the method of the embodiment of the invention.

In FIG. 4, the x-axes indicates common time axis, the period between the time point T1 and the time point T2 represents a first deposition mode which is referred as "deposition" in the drawing. Additionally, the period between the time point T2 and the time point T3 represents a non-deposition mode which is labeled "non-deposition" in the drawing. The period between the time point T3 and the time point T4 represents a second deposition mode which is referred as "deposition" in the drawing.

Here, the time point T2 corresponds to the point X2 in FIG. 1 and the time point T3 corresponds to the point X1 in FIG. 1.

Furthermore, in the charts shown in FIG. 4, the y-axis indicates changes in the flow rates of the flaming gas ($H_2$ gas) and the purge gas ($N_2$ gas) which are supplied to the flaming gas port 33 in PART(a). The y-axis indicates the flow rates of the seal gas (Ar gas) and the flaming gas ($H_2$ gas) which are supplied to the seal gas discharge nozzle 32 in PART(b). The y-axis indicates the flow rate of the supporting gas ($O_2$ gas) which is supplied to the supporting gas discharge nozzle 34 in PART(c). The y-axis indicates the flow rate of the glass source material gas ($SiCl_4$) which is supplied to the glass source material gas discharge nozzle 31 in PART(d).

In PART(a) of FIG. 4, reference numeral a1 represents the gas flow being stopped near the time point T2. Reference numeral a2 represents the gas flow rate being zero. Reference numeral a3 represents the gas flow return operation being started. Near the time point T3, reference numeral a4 represents the gas flow being restored to the original gas flow before stopping the gas flow.

As shown in PART(b) of FIG. 4, at the time of entering the non-deposition mode, before the gas flow of the flaming gas in the flaming gas port 33 is stopped, the seal gas is replaced with the flaming gas, and the pilot burner is thereby prepared.

It is only necessary to maintain a minimal flow rate of the flaming gas so that the pilot burner does not disappear in the non-deposition.

Specifically, in PART(a) of FIG. 4, the change from a1 to a2 means that the flaming gas supplied to the flaming gas port 33 is stopped and the purge gas is started to flow to the flaming gas port 33 as indicated by "a2" instead of the flaming gas.

The "c1" in the supporting gas ports 34 shown in PART(c) of FIG. 4 corresponds to substantially the same time point as "a2" shown in PART(a) of FIG. 4.

For this reason, even the change from c1 to c2 in PART(c) of FIG. 4, that is, even where the flow rate of the supporting gas decreases, the end of the nozzle 34 does not glow due to the effect of the purge gas.

It is noted that, the time of reducing the flow rate of the supporting gas after "c1", or of supplying of the supporting gas is stopped, or of starting of replacing the supporting gas with the purge gas, is determined to be the time on or after "a2".

That is, the important point is the purge gas flowing to the port 33.

As shown in PART(c) of FIG. 4, the flow rate of the supporting gas supplied to the supporting gas discharge nozzle 34 in the non-deposition is controlled so as to be equal to the flow rate level represented by "z1" in the deposition or to be the flow rate level z2 which is lower than the level "z1".

Furthermore, the supply of the supporting gas may be completely stopped or the supporting gas may be replaced with the purge gas (not shown in the figure).

As shown in PART(d) of FIG. 4, the flow rate of the glass source material gas supplied to the glass source material gas discharge nozzle 31 is reduced so as to cross over the time point T2 (d1→d2) and increases so as to cross over the time point T3 (d3→d4).

PART(d) of FIG. 4 shows an example that the flow rate of the glass source material gas decreases by half at the time points T2 and T3 compared with the flow rate of the deposition.

That is, the profile in which the gas flow rate increases and decreases as mentioned above means intentionally shifting the timing of switching between the deposition mode and the non-deposition mode from the timing of replacing the flaming gas.

If the two timings are the same as each other, two gases different from each other instantaneously mixed, the gases are three-dimensionally disturbed in the mixed state, easily unstable, and easily deteriorated into a state where the controllability thereof fails.

In contrast, in the case where two timings are intentionally shifted from each other as shown in PART(d) of FIG. 4, since the gas flow rate is controlled so that the flaming gas is sequentially switched in order, the stability of the flame state is easily ensured, and the controllability thereof is thereby improved.

Particularly, since a state can be maintained where high-temperature portion of the flaming gas is stably generated at the position distantly separated from the nozzle end, the temperature of the nozzle end does not increase to a high temperature.

That is, since the conditions where the temperature of the nozzle end increases to a high temperature are not made, more preferable inflammation is carried out.

In the invention, the principle described below is utilized.

(1) When the flow velocities of the flaming gas and the supporting gas are too low, the end of the supporting gas nozzle glows at the flaming gas port 33.

When the flow velocities of the flaming gas and the supporting gas are low, since the flaming gas and the supporting gas burn at the position close to the nozzle end, the temperature of the nozzle end increases to a high temperature.

Consequently, it is only necessary to increase the flow velocity of the flaming gas or the supporting gas.

Figure 5:
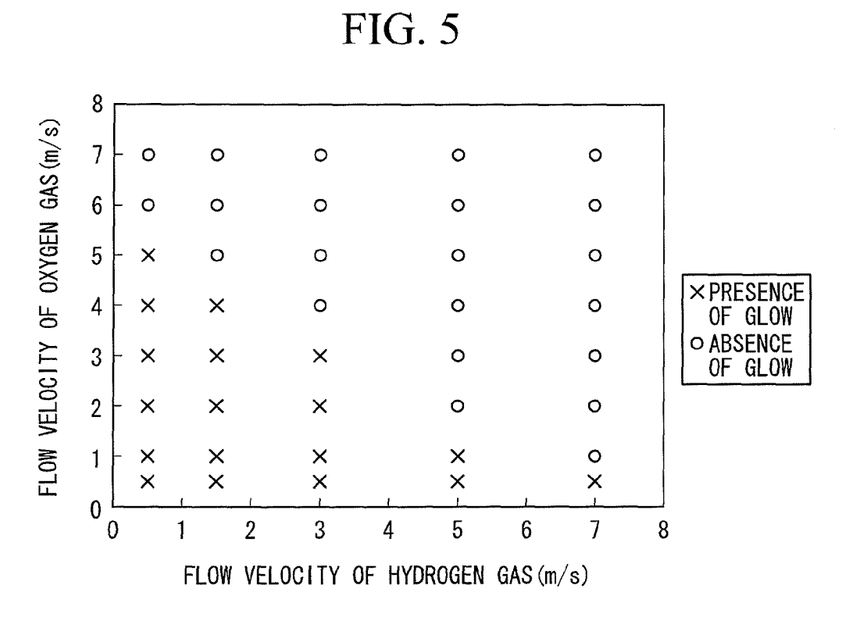
FIG. 5 is a view illustrating result of visually evaluating a glowing state of the nozzle end when inflammation is carried out while varying each average flow velocity of a flaming gas and a supporting gas.

FIG. 5 shows an experimental result that the flaming gas ($H_2$ gas) and the supporting gas ($O_2$ gas) burn by use of the multi-nozzle burner having the nozzle structure shown in FIG. 3 when average flow velocities of the flaming gas and the supporting gas vary.

FIG. 5 shows a result of visually evaluating a glowing state of the end of the supporting gas nozzle when this experiment is carried out.

As evidenced by FIG. 5, in the case where the flow velocity of the $O_2$ gas is constant, it was found that when the flow velocity of the $H_2$ gas becomes low, a glowing state occurs.

Moreover, in the case where the flow velocity of the $O_2$ gas is high, it was found that even when the flow velocity of the $H_2$ gas becomes low at some level, the nozzle end does not glow.

As a result, in the case of the multi-nozzle burner, it was found that, when the flow velocity of the oxygen gas is greater than or equal to, for example, 6 [m/sec], the glowing is not observed, and a problem in that the product life of the burner becomes short is solved.

In other cases, the experimental result is absolutely an example, the invention is not limited to the above-described numerical value.

When determination of the flow rate of the supporting gas, the flow rate of the supporting gas at which the supporting gas discharge nozzles does not glow is determined by varying both the flow rates of the flaming gas and the supporting gas as shown in the charts shown in FIG. 5.

In the case where the flow velocity of the flaming gas is preliminarily determined, the flow velocity of the supporting gas at which the supporting gas begins to glow is searched by increasing or decreasing the flow velocity of the supporting gas, therefore, it is possible to search the flow velocity of the supporting gas at which the supporting gas discharge nozzles does not glow.

(2) Furthermore, in the state where the supporting gas or the flaming gas is substituted with the inert gas, since burning does not occur, the temperature of the end of the supporting gas nozzle does not increase to a high temperature.

It is only necessary to use a gas having a low fire supporting property as a purge gas for purging the supporting gas and only necessary to use a gas having a low flammability as a purge gas for purging the flaming gas. For example, an inert gas, a nitrogen gas, or the like is preferably used in terms of ease in handling.

In the flaming burner 3 having the nozzle structure shown in FIG. 3, a pilot burner state is made by causing the flaming gas to flow to the seal gas discharge nozzle 32.

On the other hand, at the flaming gas port 33, a visual evaluation of the glowing state of the nozzle end of the oxygen gas nozzle was carried out while the flow velocity of the supporting gas flowing to the supporting gas nozzle is varied in the range of 0 to 8 m/sec in the state where the nitrogen gas flows to the flaming gas port 33 provided around the supporting gas nozzle. At this time, it was confirmed that the nozzle does not glow.

Furthermore, a visual evaluation of the glowing state thereof was carried out while the flow velocity of the nitrogen gas flowing to the supporting gas nozzle is varied in the range of 0 to 8 m/sec, it was also confirmed that the nozzle does not glow.

(3) The flame which is generated by only using the flaming gas is easily extinguished by blowing, but, it is difficult for the flame along with the supporting gas to be extinguished.

That is, according to the invention, by shifting to the state (2) while maintaining the state (1), and thereafter by making the flow velocity of the supporting gas low, the conditions where the temperature of the nozzle end increases to a high temperature are not made.

In either the case where the flow velocity of the flaming gas decreases in the state change from (1) to (2) or the case where the flow velocity of the supporting gas decreases, the temperature of the nozzle end does not increase to a high temperature.

Particularly, according to the invention, as a result of maintaining the state where the supporting gas flows at the flow velocity greater than or equal to the flow velocity at which the nozzle end does not glow at the flaming gas port 33 when a mode is changed from the deposition mode to the non-deposition mode, the nozzle end does not glow even though the flow velocity of the flaming gas becomes slow at some level.

In the state where the flaming gas is replaced with the purge gas, since inflammation does not occur, the temperature of the nozzle end does not increase to a high temperature.

Subsequently, as a result of stopping the supply of the supporting gas or replacing the supporting gas with the purge gas, the conditions where the temperature of the nozzle end increases to a high temperature are not made.

In either the case of reduction in the flow velocity of the flaming gas or the case of reduction in the flow velocity of the subsequent supporting gas, the temperature of the nozzle end does not increase to a high temperature.

Particularly, since the supporting gas discharge nozzle supplying the supporting gas is arranged separately from the seal gas discharge nozzle supplying the flaming gas in the non-deposition mode, it is possible to prevent the nozzle end from glowing.

Moreover, since the pilot burner is maintained by the flaming gas flowing to the seal gas discharge nozzle 32, it is possible to reliably and quickly perform ignition using the pilot burner when a mode is changed from the non-deposition mode to the deposition mode in a subsequent step, and the efficiency is not made low.

As a result, according to the invention, it is possible to inhibit the nozzle end portion due to glowing from being degraded without a reduction in deposition efficiency, particularly, degradation in the nozzle end portion can be inhibited in the case where the transferring from the deposition mode to the non-deposition mode (pilot burner state) is frequently repeated.

In other cases, after the above-described step a, a step of stopping the supply of the flaming gas of the seal gas discharge nozzle 32 and extinguishing the fire may be provided.

In this case, it is possible to quickly and naturally extinguish the fire by stopping the flaming gas of the seal gas discharge nozzle 32.

Consequently, in the case where the flaming burner 3 is returned to the deposition start position X1, when a mode is changed from the non-deposition mode to the deposition mode, after ignition is carried out by providing the flaming gas to the seal gas discharge nozzle 32, the supporting gas flows at the flow velocity greater than or equal to the flow velocity at which the nozzle end does not glow in the flaming gas port 33, and inflammation is started by beginning the supply of the flaming gas (step β).

That is, in a state where the purge gas flows to the flaming gas port 33, the flaming gas flowing from the seal gas discharge nozzle 32 is ignited.

More particularly, while the purge gas flows to the flaming gas port 33 and the flaming gas flows to the seal gas discharge nozzle 32, the flaming gas is ignited.

At this time, after the flow rate of the supporting gas becomes greater than or equal to a predetermined flow rate, the purge gas flowing to the flaming gas port 33 is replaced with the flaming gas.

In the embodiment, the seal gas discharge nozzle 32 capable of supplying the flaming gas is disposed adjacently at the flaming gas port 33 in which the supporting gas nozzle is arranged inside thereof in the flaming burner 3.

In the arrangement in which the seal gas discharge nozzle 32 is adjacent to the flaming gas port 33, when the pilot burner is maintained by the flaming gas flowing to the seal gas discharge nozzle 32, it is possible to reliably and naturally ignite (catch fire) by starting of the flaming gas flow to the adjacent flaming gas port 33.

That is, in order to make possibility of failing ignition low, it is preferable that the seal gas discharge nozzle 32 and flaming gas port 33 are adjacent to each other.

In the flaming burner 3 having the nozzle structure shown in FIG. 3, ignition was uneventfully carried out by switching to flaming gas ($H_2$ gas) in the state where the flaming gas is made to be pilot burner state at the seal gas discharge nozzle 32, the supporting gas ($O_2$ gas) flows to the supporting gas nozzle of the flaming gas port 33 by 6 [m/sec], and the inert gas ($N_2$ gas) flows to the flaming gas port 33.

In contrast, when the method similar to the above method is attempted by use of a flaming burner 3 having a structure in which the seal gas discharge nozzle 32 and the flaming gas port 33 are adjacent to each other, there were cases of ignition failure.

As described above, according to the invention, even when fire power is made low when a mode is changed from the deposition mode to the non-deposition mode (fire extinguishing), the nozzle is not deformed due to being high temperature, degradation is prevented due to action of glowing of the nozzle of the burner, and it is possible to prolong the product life thereof.

In the deposition mode, since it is possible to make an inert gas or the like inhibiting burning reaction to flow by an optimal flow rate for deposition, the deposition mode does not cause a reduction in the deposition rate.

Additionally, since a flame is maintained by the pilot burner, means (device) for re-igniting are not necessary when a mode is changed (ignition) from the non-deposition mode to the deposition mode, and it is possible to reliably and quickly ignite without a reduction in efficiency.

Furthermore, a seal layer or the like at the periphery of the oxygen nozzle is not necessary regarding a structure of the burners. Also, since a function for switching the flaming gas and the purge gas is only added to a gas supply system, the structure of a burner or a gas supply system does not become complicated.

Consequently, it is possible to prevent initial trouble which is caused by reduction in a burner quality (degree of precision) or the like and occurs at or after the time of beginning of use.

Moreover, since a simplified structure is realized, the efficiency is not made low.

As a result, according to the invention, degradation in the nozzle end portion which is due to the nozzle end portion glowing is inhibited without a reduction in deposition efficiency, particularly, degradation therein is inhibited in the case where the transferring from the deposition mode to the non-deposition mode (pilot burner state) is frequently repeated.

Particularly, apparatus of the invention for producing an optical fiber preform is provided with the flaming burner 3 having the above-described structure. In addition, the production apparatus is provided with the first gas switching mechanism for replacing the seal gas flowing to the seal gas discharge nozzle 32 with the flaming gas or replacing the flaming gas flowing to the seal gas discharge nozzle 32 with the seal gas when a mode is changed from the deposition mode to the non-deposition mode. Furthermore, the manufacturing apparatus is provided with the second gas switching mechanism. While maintaining the pilot burner by the flaming gas flowing to the seal gas discharge nozzle 32, the second gas switching mechanism maintains a state where the supporting gas flows at the flow velocity greater than or equal to the flow velocity at which the nozzle end of the supporting gas discharge nozzles 34 does not glow, and the second gas switching mechanism replaces the flaming gas flowing to the flaming gas port 33 with the purge gas. Thereafter, the second gas switching mechanism stops the supply of the supporting gas or replace the gas with the purge gas. For this reason, by employing a manufacturing apparatus with a simplified constitution, degradation in a nozzle end portion which is caused by the nozzle end portion glowing is inhibited, and it is possible to prolong the product life of the flaming burner 3.

Additionally, as an example of the nozzle structure of the flaming burner 3, the case where one seal gas discharge nozzle is provided outside one glass source material gas discharge nozzle is described in the above-described embodiment, however, the invention is not limited to this configuration.

Figure 6:
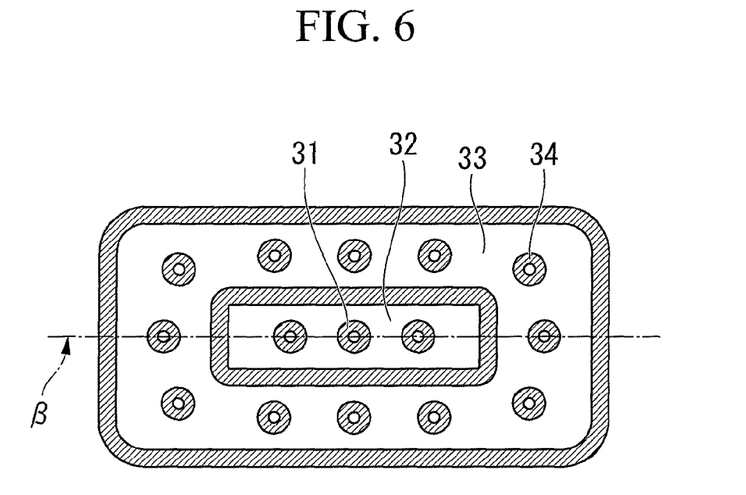
FIG. 6 is a view showing a modified example of the nozzle of the flaming burner as seen from the end of the flaming burner.

For example, as a flaming burner 3B (3) shown in FIG. 6, a constitution in which a seal gas discharge nozzle 32 is arranged around a plurality of glass source material gas discharge nozzles 31 may be used.

Furthermore, in the structure shown in FIG. 6, glass source material gas discharge nozzles 31 are collectively arrayed inside the seal gas discharge nozzle 32, however, a constitution may be used in which the seal gas discharge nozzle 32 is disposed outside individual glass source material gas discharge nozzle 31.

FIG. 6 shows an example of a structure in which the flaming gas port 33 is disposed outside the seal gas discharge nozzle 32. In this drawing, all of nozzles are laid out such that the nozzles are symmetrical to each other with respect to the symmetry axis represented by reference numeral β.

That is, the flaming gas port 33 is arranged in a concentric pattern with respect to the glass source material gas discharge nozzle 31.

Moreover, the case of providing one flaming gas port 33 is described as an example in the above-described embodiment, but the invention is not limited to this configuration. Two or more flaming gas port 33 may be provided.

Figure 7:
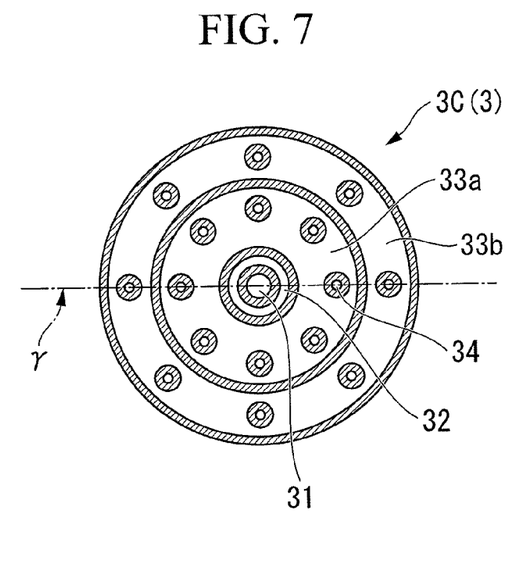
FIG. 7 is a view showing a modified example of the nozzle of the flaming burner as seen from the end of the flaming burner.

For example, a structure may be employed in which two flaming gas port 33 (33a, 33b) are provided such as the flaming burner 3C (3) shown in FIG. 7.

In this case, when ignition is carried out using the pilot burner maintained at the seal gas discharge nozzle, it is preferable that ignition be carried out in the order from the port close to the seal gas discharge nozzle such that ignition is carried out at the flaming gas port 33b after ignition is carried out at the flaming gas port 33a.

FIG. 7 shows an example of a structure in which the flaming gas ports 33a and 33b are disposed outside the seal gas discharge nozzle 32. In this drawing, all of nozzles are laid out such that the nozzles are symmetrical to each other with respect to the symmetry axis represented by reference numeral γ.

That is, the flaming gas ports 33a and 33b are arranged in a concentric pattern (concentric circle form) with respect to the glass source material gas discharge nozzle 31.

Figure 8:
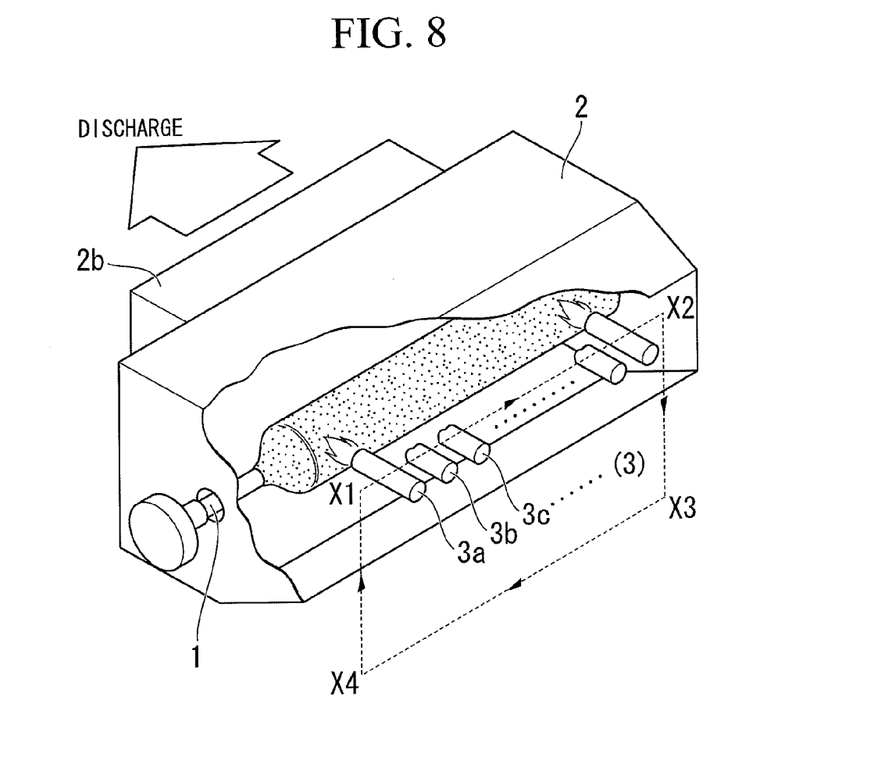
FIG. 8 is an explanatory diagram substantially illustrating an example of a manufacturing apparatus system used for a method of producing optical fiber preform.

Additionally, the case is described in the embodiment where one flaming burner 3 used for combining the glass particles is arranged, however, the invention is not limited to this configuration. For example, as shown in FIG. 8, a plurality of flaming burners 3a, 3b, and 3c (3) used for combining the glass particles may be arranged.

Moreover, in the above-described embodiment, the flaming burner 3 is arranged at the opening portion 2a of the chamber 2 and the traverse of the flaming burner 3 is carried out, however, the structure of the chamber 2 is not limited to the above-described embodiment. A chamber having a slit (gap) through which the flaming burner 3 can merely exit from the chamber and enter into the chamber, may be used without using a large opening portion.

WORKING EXAMPLES

Hereinbelow, Working Examples of the invention and comparative examples will be described.

Working Example 1

A glass-particle-deposited layer was formed on the periphery of the target element by use of the flaming burner having the nozzle structure as shown in FIG. 3 and by performing traverse of the flaming burner two or more times in the axial direction of the rotated target element, a glass-particle-deposited body was obtained, and an optical fiber preform was thereby manufactured.

At this time, particularly, when a mode is changed from the deposition mode in which glass particles are deposited on the periphery of the target element to the non-deposition mode in which the glass particles are not deposited on the periphery of the target element, the step α was carried out which maintains a state where the supporting gas flows at the flow velocity greater than or equal to the flow velocity at which the nozzle end does not glow in the flaming gas port while maintaining the pilot burner using the flaming gas flowing to the seal gas discharge nozzle and replaces the flaming gas flowing to the flaming gas port with the purge gas. Furthermore, not only the step α but also a step β was carried out when a mode is changed from the non-deposition mode to the deposition mode. The step β maintains a state where the supporting gas flows at the flow velocity greater than or equal to the flow velocity at which the nozzle end does not glow in the flaming gas port while maintaining the pilot burner using the flaming gas flowing to the seal gas discharge nozzle and replaces the purge gas with the flaming gas. The foregoing steps α and β are alternately performed two or more times.

In the non-deposition mode, the supply of the supporting gas is stopped at the period when the purge gas flows to the flaming gas port.

A hundred optical fiber preform was manufactured by use of the aforementioned method.

During the above-described step α or step β, the nozzle end state was visually confirmed.

As a result, glowing nozzle was not visually confirmed at all time during the steps, and deformation in the nozzle was not confirmed.

Particularly, when the pilot burner is being generated, the flow rate of the flaming gas ($H_2$ gas) was 10 slm.

Working Example 2

The flow rate of the flaming gas ($H_2$ gas) was set to 7 slm when the pilot burner is being generated, and a hundred optical fiber preform was manufactured in a similar manner to the above-described Working Example 1.

As a result, when third optical fiber of hundred optical fiber preform is being manufactured, the pilot burner was extinguished, however, pilot burner was not extinguished by making the supporting gas ($O_2$ gas) to flow at the flow rate of 4 slm along with the pilot burner even where a hundred optical fiber preform was manufactured.

Working Example 3

In the case of manufacturing an optical fiber preform in a similar manner to the above-described Working Example 1, at the time of fire extinguishing, the fire extinguishing is carried out by use of the method of stopping the supply of the flaming gas of the seal gas discharge nozzle.

As a result of visually confirming the nozzle end state when the fire extinguishing was carried out, the nozzle glowing was not confirmed.

Working Example 4

In the case of manufacturing an optical fiber preform in a similar manner to the above-described Working Example 1, when a mode is changed from the non-deposition mode to the deposition mode, after ignition is carried out by supplying the flaming gas flowing to the seal gas discharge nozzle, ignition is carried out by use of the method of making the supporting gas to flow at the flow velocity greater than or equal to the flow velocity at which the nozzle end does not glow in the flaming gas port and starting inflammation by beginning the supply of the flaming gas.

As a result, when the nozzle end state is visually evaluated at the time of ignition, the nozzle glowing was not observed.

Comparative Example 1

An optical fiber preform was manufactured by use of the flaming burner having the nozzle structure as shown in FIG. 3.

However, when a mode is changed from the deposition mode to the non-deposition mode, while the seal gas is flowing to the seal gas discharge nozzle, the supporting gas ($O_2$ gas) was replaced with the purge gas, furthermore, the flow rate of the flaming gas was reduced to 30% of the flow rate of the deposition mode.

When a mode is changed from the non-deposition mode to the deposition mode, a reversed operation was carried out.

A hundred optical fiber preform was manufactured by use of the method.

During the steps, the nozzle end state was visually confirmed.

As a result, in either the case of making a pilot burner or the case of returning from the pilot burner, glowing was observed.

Additionally, the nozzle was deformed after the hundred optical fiber preform has been manufactured, and the deposition efficiency thereof was 20% lower than that of the aforementioned Working Example.

Comparative Example 2

In the case of manufacturing an optical fiber preform in a similar manner to the Comparative Example 1, fire extinguishing is performed in order of the supporting gas ($O_2$ gas) and the flaming gas ($H_2$ gas).

As a result of visually confirming the nozzle end state when the fire extinguishing was carried out, the nozzle glowing was confirmed.

Comparative Example 3

In the case of manufacturing an optical fiber preform in a similar manner to the Comparative Example 1, ignition is performed in order of the flaming gas ($H_2$ gas) and the supporting gas ($O_2$ gas) when a mode is changed from the non-deposition mode to the deposition mode.

As a result, when the nozzle end state is visually evaluated at the time of ignition, the nozzle glowing was observed.

From above-described result of comparing Working Example 1 and Comparative Example 1, it was confirmed that the conditions where the temperature of the nozzle end increases to a high temperature are not made by use of the method of the embodiment related to the invention when a mode is changed from the deposition mode to the non-deposition mode or when a mode is changed from the non-deposition mode to the deposition mode, and it is possible to prevent the degradation in the nozzle end portion which is due to nozzle end portion glowing.

Additionally, compared Working Example 3 and Comparative Example 2, as a result of stopping the supply of the flaming gas flowing to the flaming gas port when fire extinguishing is carried out, it was confirmed that the fire extinguishing can be quickly and naturally extinguish the fire.

Furthermore, compared Working Example 4 and Comparative Example 3, it was confirmed that, when the pilot burner is maintained by one flaming gas port, it is possible to reliably and naturally ignite (catch fire) by starting of the flaming gas flow to another adjacent flaming gas port.

In the above-description, the apparatus and the method for producing an optical fiber preform of the invention. The technical scope of the invention is not limited to the above embodiments, but various modifications may be made without departing from the scope of the invention.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

The invention is widely applicable to a method and an apparatus of producing optical fiber preform by use of a so-called outside vapor phase deposition method.

In other cases, the invention is particularly effective in a deposition method of frequently and repeatedly generating a pilot burner state, but the invention is also effective in a process of manufacturing a porous solid, in which general ignition and fire extinguishing are repeatedly carried out.

What is claimed is:

1. A method of producing optical fiber preform, the method comprising:
   preparing a flaming burner configured to include a glass source material gas discharge nozzle, a seal gas discharge nozzle disposed outside the glass source material gas discharge nozzle, a plurality of supporting gas discharge nozzles arranged separately from the seal gas discharge nozzle, and a flaming gas port disposed outside the seal gas discharge nozzle so as to include the supporting gas discharge nozzles, the supporting gas discharge nozzles having a small hole diameter;
   forming a deposited layer by depositing glass particles on a periphery of a target element in a deposition mode in which the glass particles are deposited on the periphery of the target element by performing traverse of the flaming burner two or more times in an axial direction of the rotated target element while burning a mixed gas containing a glass source material gas, a flaming gas, and a supporting gas by use of the flaming burner;
   maintaining a state where the supporting gas flows at a flow velocity greater than or equal to a flow velocity at which a nozzle end of the supporting gas discharge nozzles does not glow while maintaining a pilot burner by allowing the flaming gas to flow to the seal gas discharge nozzle after a seal gas is replaced with the flaming gas in a case where a mode is changed from the deposition mode to a non-deposition mode in which the glass particles are not deposited on the periphery of the target element; and
   replacing the flaming gas flowing to the flaming gas port with a purge gas.

2. The method of producing optical fiber preform according to claim 1, wherein
   after the flaming gas flowing to the flaming gas port is replaced with the purge gas, one of maintaining of a flow rate of the supporting gas, decreasing of the flow rate of the supporting gas, stopping of supply of the supporting gas, and replacing the supporting gas with the purge gas is carried out.

* * * * *